United States Patent
King et al.

(10) Patent No.: US 6,221,137 B1
(45) Date of Patent: Apr. 24, 2001

(54) METAL PHTHALOCYANINE COLORANTS FOR PHASE CHANGE INKS

(75) Inventors: Clifford R. King, Salem; Donald R. Titterington, Tualatin; Jeffrey H. Banning, Hillsboro, all of OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/336,135

(22) Filed: Jun. 18, 1999

(51) Int. Cl.$^7$ .......................... C09D 11/00; C09D 62/00; C09C 62/00
(52) U.S. Cl. .................... 106/31.29; 106/31.61; 540/129; 540/139; 540/135
(58) Field of Search .................... 540/139, 129, 540/135; 106/31.29, 31.61

(56) References Cited

U.S. PATENT DOCUMENTS

| | | | |
|---|---|---|---|
| 415,880 | 11/1889 | Patt | 72/78 |
| 2,153,740 | 4/1939 | Whittier et al. | 540/129 |
| 2,213,726 | 9/1940 | Whyler et al. | 502/400 |
| 2,469,663 | 5/1949 | Moser | 540/144 |
| 2,492,732 | 12/1949 | Bucher | 540/123 |
| 4,450,268 | 5/1984 | Achar et al. | 528/327 |
| 5,296,034 * | 3/1994 | Dietz et al. | 106/412 |
| 5,380,842 | 1/1995 | Itoh et al. | 540/128 |

FOREIGN PATENT DOCUMENTS 09249814   9/1997  (JP) .

OTHER PUBLICATIONS

Phthalocyanines Properties and Applications, C.C. Leznoff and A.B.P. Lever QD 441, p. 37, vol. 3, no date available.
The Chemistry of Synthetic Dyes vol. II, K. Venkataraman 1952, Academic Press, NY, Chapter XXXVII Phthalocyanines, no month available.
Synthesis of Water Soluble Phthalocyanine, Youji Huaxue, 1990, 10, 550–553 (Abstract of Article), no month available.
Phthalocyanine Compounds, Frank H. Moser and Aurthur L. Thomas, Reinhold Publishing Co, NY, p. 105, no date available.
Preparation & Structural Investigations of Copper (II), Cobalt (II), ect. Indian Journal of Chemistry, vol. 27A, May 1998, p. 411–416.
A New Solid–Phase Polymerization—Metal Phthalocyanine Sheet Polymers, Journal of Polymer Science, Polymer Chemistry Edition,vol.21 589–597 (1983), no month available.
Synthesis and Properties of Soluble Metal–free Phthalocyanines Containing Tetra or Octa Alkyloxy Substituents, 1998 (Abstract of Article), no month available.
Thermal Stabilities of Metal –4,4',4",4 '" Tetracarboxyphthalocyanine Complexes, Chinese Journal Abstract, 1993, no month available.
Synthesis of Water Soluble Phthalocyanines, Chinese Journal Abstract, 1991, no month available.
Preparation and Structural Investigations of Copper (II) Cobalt (II) Nickel (II) & Zinc (II) Derivatives etc., English Journal Abstracts, 1988, no month available.
The Manufacture of Phthalodinitrile At The I.G. Farbenindustrie Plant At Ludwigshafen,Office of Military Government for Germany,Fiat Final Report 1309, no date available.
Functional Metallo–Macrocycle Derivative and Their Polymers, 16a), Department of Functional Polymer Science, Shinshu University, Ueda–shi, 296 Japan (1986), no month available.

* cited by examiner

*Primary Examiner*—Helene Klemanski
*Assistant Examiner*—Veronica F. Faison
(74) *Attorney, Agent, or Firm*—Oliff & Berridge, PLC

(57) ABSTRACT

Phase change inks containing at least one colorant that comprises at least one metal phthalocyanine tetraamide chromogen, at least one metal phthalocyanine tetraester chromogen, or mixtures thereof.

36 Claims, No Drawings

METAL PHTHALOCYANINE COLORANTS FOR PHASE CHANGE INKS

BACKGROUND OF THE INVENTION

1. Field of the Invention

The present invention relates to the use of selected metal phthalocyanine colorants in phase change inks. In particular, the invention relates to phase change ink compositions that comprise the combination of at least one phase change ink carrier composition and a compatible phase change ink colorant that comprises at least one metal phthalocyanine tetraamide dye, or at least one metal phthalocyanine tetraester dye, or mixtures thereof. The invention also discloses the preparation of metal phthalocyanines, optionally or selectively, as a distribution of mono-, di-, tri- or tetra-substituted chromophores containing esters and/or amides. The present invention also relates to, as novel compositions-of-matter, selected metal phthalocyanine tetraester compounds that are useful as dyes.

2. Brief Description of the Art

Phase change inks in digital printing applications (also sometimes called solid inks or hot melt inks) have in the past decade gained significant consumer acceptance as an alternative to more traditional printing systems such as offset printing, flexography printing, gravure printing, letterpress printing and the like. Phase change inks are especially desirable for the peripheral printing devices associated with computer technology, as well as being suitable for use in other printing technologies such as gravure printing applications as referenced in U.S. Pat. No. 5,496,879 and German Patent Publications DE4205636AL and DE4205713AL assigned to Siegwerk Farlenfabrik Keller, Dr. Rung & Co.

In general, phase change inks are in the solid phase at ambient temperature, but exist in the liquid phase at the elevated operating temperature of an ink jet printing device. At the print head operating temperature, droplets of liquid ink are ejected from the printing device and, when the ink droplets contact the surface of the printing media, they quickly solidify to form a predetermined pattern of solidified ink drops.

Phase change inks are easy to use and safe. They can be easily loaded into the printer by the user, generally in the form of solid sticks of yellow, magenta, cyan and black ink having a solid consistency similar to children's crayons. Inside the printer, these inks are melted at an elevated temperature in a print head having a number of orifices, through which the melted ink will be ejected onto the desired substrate such as media like paper or an overhead transparency film. Alternatively, the melted ink may be transferred to a rotating drum and then transferred to the substrate. As the ink cools on the substrate, it re-solidifies into the desired image. This resolidification process, or phase change, is instantaneous and a printed, dry image is thus made upon leaving the printer, which is available immediately to the user.

These phase change inks contain no solvents or diluents that can lead to undesired emissions. In all, the use and specific design of the phase change ink addresses many of the limitations of more traditional ink and printing processes.

Furthermore, because the ink is in a cool, solid form at any time when the user can actually come in contact with the ink, and the ink is in a molten state only inside the printer (inaccessible to the user), it is generally safe to use. These inks also have long-term stability for shipping and long storage times.

The phase change inks generally comprise a phase change ink carrier composition, which is combined with at least one compatible phase change ink colorant. The carrier composition has been generally composed of resins, fatty acid amides and resin derived materials. Also, plasticizers, waxes, antioxidants and the like have been added to the carrier composition. Generally the resins used must be water-insoluble and the carrier composition may contain no ingredients that are volatile at the jetting temperatures employed. Also, these carrier ingredients should be chemically stable so as not to lose their chemical identity over time and/or under elevated temperature conditions.

Preferably, a colored phase change ink will be formed by combining the above described ink carrier composition with compatible colorant material, preferably subtractive primary colorants. The subtractive primary colored phase change inks comprise four component dyes, namely, cyan, magenta, yellow and black. U.S. Pat. Nos. 4,889,560 and 5,372,852 teach the preferred subtractive primary colorants employed. Typically these may comprise dyes from the classes of Color Index (C.I.) Solvent Dyes, C.I. Disperse Dyes, modified C.I. Acid and Direct Dyes, as well as a limited number of C.I. Basic Dyes. Also suitable as colorants are appropriate polymeric dyes, such as those described in U.S. Pat. No. 5,621,022 and available from Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, and uncut Reactant Violet X-80 or those described in U.S. Pat. No. 5,231,135.

Colored resin reaction products such as those described in U.S. Pat. No. 5,780,528 issued Jul. 14, 1998, and assigned to the assignee of the present invention, are also suitable colorants.

Polymeric colorants have also been utilized in preparing commercial phase change inks. These colorants also possess potential for use in other applications, such as gravure printing, and other types of inks and coating applications where coloration is desired. For example, the specific class of polymeric dyes are characterized by: (1) an organic chromophore having (2) a polyoxyalkylene substituent and optionally (3) a carboxylic acid or non-reactive derivative thereof covalently bonded to the polyoxyalkylene substituent, having been described in U.S. Pat. No. 5,621,022 (Jaeger et al.).

Copper phthalocyanine dyes and pigments have also been employed as chromogens for many applications requiring a cyan to a green color. Furthermore, it is known that many derivatives of copper phthalocyanine can be made. Yet, copper phthalocyanine and many of its derivatives have some shortcomings when used in phase change inks. For example, solubility and stability problems may arise when these types of colorants are mixed with certain waxy components in phase change inks. Numerous references describe their preparation, modifications, and applications. "Phthalocyanine Compounds", Moser & Thomas 1963 by Reinhold Publishing Corp. and "Phthalocyanines Properties and Applications", Volumes 1–4 edited by Liznoff and Lever, 1990, '92, '93 & '96 by John Wiley & Sons/VCH Publication are two references that describe many of these. Furthermore, many derivatives of copper phthalocyanine (CPC) are difficult to prepare. For example, a common derivatization procedure involves the chlorosulfonation of CPC to yield chlorosulfonated CPC intermediates, which can be subsequently derivatized with various nucleophiles or quenched in aqueous bases to make acid dyes. However, this class of chlorosulfonated intermediate has a limited shelf life and must be refrigerated or quickly reacted. Another class of CPC derivatives is carboxylic acids of CPC. See U.S. Pat. No. 4,450,268 with Achar et al. as named inventors and Achar et al., *Indian Journal of Chemistry*, Volume 27A, May 1988, pp. 411–416. While these carboxylic acids of CPC have better shelf life and can be made easier than the chlorosulfonated CPC derivatives, their commercial feasibility, as well as commercial feasability of their intermediates and derivatives, have not yet been fully explored.

Certain phthalocyanine tetraamide compounds are known as filter dyes and useful in photoresist applications. See Japanese Kokai 09/249,814, published on Sep. 22, 1997, with Yoriaki Matsuzaki, Hirosuke Takuma and Ryu Oi as named inventors and assigned to Mitsui Toatsu Chemicals, Inc. This patent is referenced as Chemical Abstracts 127:308427m.

The present invention seeks to retain the known advantages of phthalocyanine chromogens (e.g., outstanding lightfastness and thermal stability) while overcoming the insolubility of phthalocyanine pigments and short shelf life problems of chlorosulfonated CPC intermediates, as well as eliminating the above-noted manufacturing disadvantages of their preparation. Furthermore, the present invention provides dyes with good cyan coloration, as well as allowing for easy tailoring or modification of the physical and mechanical properties of this class of colorants (e.g., making the dyes more resin or wax-like).

BRIEF SUMMARY OF THE INVENTION

Accordingly, one aspect of the present invention is directed to phase change ink compositions that comprise the combination of at least one phase change ink carrier component and a compatible phase change ink colorant that comprises at least one metal phthalocyanine tetraamide chromogen, at least one metal phthalocyanine tetraester chromogen, or mixtures thereof.

Another aspect of the present invention is directed to metal phthalocyanine tetraester dyes of Formula (I) as novel compositions-of-matter:

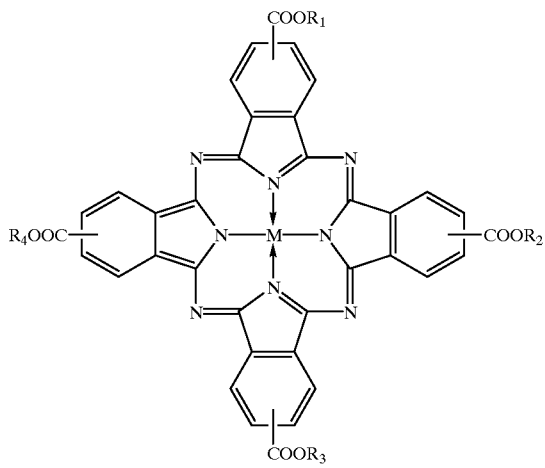

(I)

Another aspect of the present invention is directed to metal phthalocyanine tetraamide dyes of Formula (II) as novel compositions-of-matter:

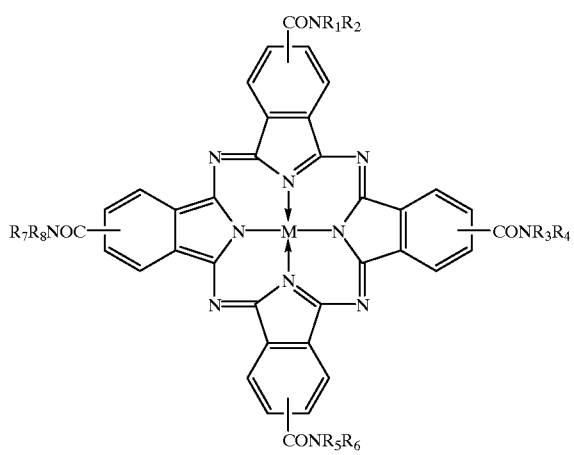

(II)

It is another feature of the present invention that these two classes of metal phthalocyanine dyes are liquid at the elevated temperatures at which phase change ink printers operate, yet are solid at room temperatures.

It is another feature of the present invention that these metal phthalocyanine dyes may be used as either the sole colorant material or can be used with other conventional phase change ink colorant materials in a phase change ink.

It is yet another feature of the present invention that the metal phthalocyanine dyes are soluble in the phase change ink carrier components.

It is still another feature of the present invention that these metal phthalocyanine dyes may be employed with conventional phase change carrier components (i.e., amide waxes, resinous components, tackifiers, toughening agents, hardeners, adhesion promoters, urethane and urea resins or mixed urethane/urea resins and the like) in phase change inks.

It is yet another feature of the present invention that mono-, di-, tri- and tetra-esters, amides or combinations thereof may be prepared, such as by a stoichiometric distribution of ester and/or amide substituted phthalocyanines.

It is yet another feature of the present invention that mixed alcohol, mixed amine or their combinations may be used to prepare mono-, di-, tri- or tetra-esters, amides and their combinations.

It is an advantage of the present invention that these classes of metal phthalocyanine dyes are easy to manufacture.

It is an advantage of the present invention that these two classes of metal phthalocyanine dyes may be made by simple reactions from commercially available precursors without the need of elaborate purification processes.

DETAILED DESCRIPTION OF THE PREFERRED EMBODIMENTS

The preferred phthalocyanine tetraesters useful as colorants in phase change inks are chromogens (see Formula (I) above), where M is a metal selected from the group consisting of copper, nickel, cobalt, zinc, chromium, aluminum, silicon and iron; and wherein $R_1$, $R_2$, $R_3$, and $R_4$ are individually selected from the group consisting of a linear or a branched alkyl having 1 to about 60 carbon atoms; a cycloalkyl having 1 to about 60 carbon atoms; an aryl; an alkyl/aryl; an alkyleneoxy moiety or an aryleneoxy moiety ranging from about 1 to about 250 repeating units of a homopolymer; an alkyleneoxy moiety or an aryleneoxy moiety ranging from about 1 to about 250 repeating units of a random-copolymer; an alkyleneoxy moiety or an aryleneoxy moiety ranging from about 1 to about 250 repeating units of a block-copolymer form; and mixtures thereof. More preferably, $R_1$, $R_2$, $R_3$, and $R_4$ are individually selected and $R_2$ are not both hydrogen, $R_3$ and $R_4$ are not both hydrogen, $R_5$ and $R_6$ are not both hydrogen, and $R_7$ and $R_8$ are not both hydrogen.

Other suitable metals from the Periodic Table Groups I–VIII that may form phthalocyanine tetraester and tetraamide derivatives are as follows:

| GROUP I | GROUP II | GROUP III | GROUP IV | GROUP V | GROUP VI | GROUP VII | GROUP VIII |
|---|---|---|---|---|---|---|---|
| Deuterium | Beryllium | Gallium | Titanium | Vandium | Molybdenum | Manganese | Rhodium |
| Lithium | Magnesium | Aluminum | Tin | Antimony | Uranium | | Palladium |
| Sodium | Calcium | Indium | Hafnium | | Chromium | | Osmium |
| Potassium | Cadmium | Lanthanum | Lead | | | | Platinum |
| Silver | Barium | Neodymium | Thorium | | | | Iron |
| Hydrogen | Mercury | Samarium | Silicon | | | | Cobalt |
| Copper | Zinc | Europium | | | | | Nickel |
| | | Gadolinium | | | | | |
| | | Dysprosium | | | | | |
| | | Holmium | | | | | |
| | | Erbium | | | | | |
| | | Thulium | | | | | |
| | | Ytterbium | | | | | |
| | | Lutecium | | | | | | from the group consisting of alkyleneoxy or aryleneoxy derivatives of an aryl or an alkyl/aryl moiety, where the alkyleneoxy or aryleneoxy derivatives range from about 1 to about 250 repeating units of a homopolymer, random-copolymer or block-copolymer form. Most preferably, in Formula (I) M is copper and $R_1$, $R_2$, $R_3$, and $R_4$ are linear alkyls or branched alkyls having about 21 to about 60 carbon atoms; or alkyleneoxy derivatives of an alkyl/aryl moiety ranging from about 1 to about 5 repeating units of a homopolymer form.

The preferred phthalocyanine tetraamides useful as colorants in phase change inks are chromogens within Formula (II) above, where M is a metal selected from the group consisting of copper, nickel, cobalt, zinc, chromium, aluminum, silicon and iron and wherein $R_1$, $R_2$, $R_3$, $R_4$, $R_5$, $R_6$, $R_7$ and $R_8$ are individually selected from the group consisting of hydrogen; a linear or branched alkyl or cycloalkyl having 1 to about 60 carbon atoms; aryl; alkyl/aryl; an alkyleneoxy moiety or an aryleneoxy moiety ranging from about 1 to about 250 repeating units of a homopolymer; an alkyleneoxy moiety or an aryleneoxy moiety ranging from about 1 to about 250 repeating units of a random-copolymer; an alkyleneoxy moiety or an aryleneoxy moiety ranging from about 1 to about 250 repeating units of a block-copolymer form; and mixtures thereof, and where $R_1$ and $R_2$ are not both hydrogen, $R_3$ and $R_4$ are not both hydrogen, $R_5$ and $R_6$ are not both hydrogen, and $R_7$ and $R_8$ are not both hydrogen. More preferably, $R_1$, $R_2$, $R_3$, $R_4$, $R_5$, $R_6$, $R_7$ and $R_8$ are individually selected from the group consisting of alkyleneoxy or aryleneoxy derivatives of an aryl or an alkyl/aryl moiety, where the alkyleneoxy or aryleneoxy derivatives range from about 1 to about 250 repeating units of a homopolymer, random-copolymer or block-copolymer form. Most preferably, in Formula (II) M is copper and $R_1$, $R_2$, $R_3$, $R_4$, $R_5$, $R_6$, $R_7$ and $R_8$ are individually selected from the group consisting of hydrogen; a linear alkyl or a branched alkyl having about 11 to about 60 carbon atoms; an alkyleneoxy derivative of an alkyl/aryl moiety ranging from about 1 to about 30 repeating units of a homopolymer form; and mixtures thereof, and where $R_1$ The metal phthalocyanine colorants of the present invention may be prepared by six alternative methods. In one method, a tetracarboxylic acid of the metal phthalocyanine is first made by the reaction of 1,2,4-benezenetricarboxylic anhydride (also known as trimellitic anhydride), urea, ammonium chloride and a metal salt (e.g. $CuSO_4$, $CuCl_2$ or CuCl), preferably in the presence of a catalyst (e.g., ammonium molybdate). Conversion to the phthalocyanine under these conditions is known as the "urea method." This "urea method" may be run neat or with a solvent such as nitrobenzene. This reaction mixture was heated to between about 175° C. and about 225° C. and stirred for about 1–5 hours. The resulting solid product [i.e. tetraamide $(CONH_2)_4$] was then cooled, crushed and hydrolyzed to yield a material consistent with the free tetraacid [i.e., $(COOH)_4$] of the metal phthalocyanine. This free tetraacid may then be converted into a suitable tetraester or tetraamide by a conventional esterization or amidization reaction. Obviously, more than one alcohol or amine, or some combination can be employed to yield less than a stoichiometric conversion and/or a mixture of reaction products.

Illustrative metal salt precursors may include chromium fluoride, chromium chloride, cobalt chloride, ferrous chloride, cuprous chloride, cupric chloride, cupric sulfate, and nickel chloride.

The second synthetic approach involves first reacting trimellitic anhydride chloride with a selected nucleophile (e.g. alcohol to produce trimellitic anhydride ester, amine to form trimellitic anhydride amides or combinations, usually in the presence of a non-nucleophilic base) followed by conversion of this intermediate to the ester and/or amide derivatives of the metal phthalocyanine employing the "urea method".

In the third synthetic method, an amine is first reacted with trimellitic anhydride (usually in an appropriate solvent) to form the corresponding amide salt, which is then heated to remove water and form the amide. This amide is then converted to the corresponding phthalocyanine derivative employing the "urea method".

The fourth synthetic approach involves first reacting trimellitic anhydride with a selected nucleophile(s) (e.g.

alcohol and/or amine) using a condensation agent such as DCC followed by conversion of this intermediate to the ester and/or amide metal phthalocyanine derivatives employing the "urea method."

The fifth synthetic approach involved pre-reacting the desired alcohol with acetic anhydride followed by an ester transfer reaction with trimellitic anhydride to form the corresponding trimellitic anhydride ester. The ester can be then converted to the ester phthalocyanine derivative employing the "urea method".

The sixth synthetic methodology is to prepare the ester, amide or combination of ester and amide of trimellitic anhydride followed by conversion to phthalocyanine derivatives by reaction with phthalic anhydride. In this manner, metal phthalocyanine derivative may be prepared containing different amounts of polymeric or alkyl substituents attached to the chromophore with the expected increase in color strength. In fact, a distribution of mono-, di-, tri- and tetra-substituted metal phthalocyanine derivatives can be achieved to yield desired morphological properties.

These reactions can be carried out in conventional condensation reaction equipment. Preferably, each reaction is conducted at a temperature where a molten reaction mixture is formed until the reaction is complete.

The colorant compounds of the present invention may be combined with other conventional phase change ink colorants in making a phase change ink composition. For example, it may be desirable for certain applications to combine the present colorant or colorants with one or more polymeric dyes as described in U.S. Pat. No. 5,621,022 or conventional phase change ink colorants described in U.S. Pat. Nos. 4,889,560 and 5,372,852.

Furthermore, one or more phthalocyanine colorants of the present invention (either with or without other colorants present) may be combined with conventional phase change carrier components including tetra-amide compounds, hydroxyl-functional tetra-amide compounds, mono-amides, hydroxyl-functional mono-amides, urethane and urea resins, mixed urethane/urea resins, tackfiers, plasticizers, antioxidants, viscosity reducing agents such as those disclosed in U.S. Pat. Nos. 4,889,560; 4,889,761; 5,372,852; 5,621,022; 5,700,851; 5,750,604; 5,780,528; 5,782,966; 5,783,658; 5,827,918 and 5,830,942. Suitable hardening agents may also be employed.

The preferred amounts of each colorant and carrier ingredient will depend upon the particular end-use application. The colorants in phase change inks can range from about 0.1 to about 25 percent by weight, more preferably from about 0.3 to about 10 percent by weight, and most preferably from about 2 to about 5 percent by weight.

The following Examples and Comparisons are presented to illustrate the scope of the invention and to be illustrative of the formulations that can successfully be employed, without any intent to limit the invention to the specific materials, process or structure employed. All parts and percentages are by weight and all temperatures are degrees Celsius unless explicitly stated otherwise.

EXAMPLES AND COMPARISONS

Example 1

Cyan Dye Made From Trimellitic Anhydride Chloride/IGEPAL CA210 Product and the Urea Process To a 500 ml four-neck roundbottom flask equipped with a Trubore stirrer, $N_2$ inlet, addition funnel, and thermocouple-temperature controller was added about 111.2 g (0.529 moles.) of trimellitic anhydride chloride[1] and heated until molten, at about 75° C. To the addition funnel was added 136.2 g (0.529 moles) of Igepal CA 210[2]. The Igepal CA210 was added dropwise over 3 hours while maintaining the temperature at 75° C. The reaction mixture was then heated to 135° C. with stirring under nitrogen. After 4 hours at 135° C., the temperature was increased to 160° C. A mixture of about 180 g (3.0 moles) of urea[3], about 21.05 g (0.13 moles) of copper sulfate[4], about 13.5 g (0.25 moles) of ammonium chloride[5], and about 1.5 g of ammonium molybdate[6] were quickly added and with vigorous agitation, the temperature was increased to about 170° C. over about 1 hour. The color slowly changed from a pea green to a dark cyan during this period. About 150 g of stearyl stearamide was then added and heated to about 162° C. and held for about 1 hour. This molten cyan wax colorant was then poured into aluminum molds and allowed to harden.

[1] Trimellitic Anhydride Chloride available from Aldrich Chemicals of Milwaukee, Wis.
[2] IGEPAL CA-210 Octylphenol ethoxylate is available from Rhone-Poulenc Co., Cranbury, N.J.
[3] Urea available from Aldrich Chemicals of Milwaukee, Wis.
[4] Copper Sulfate available from Aldrich Chemicals of Milwaukee, Wis.
[5] Ammonium Chloride available from Aldrich Chemicals of Milwaukee, Wis.
[6] Ammonium Molybdate available from Aldrich Chemicals of Milwaukee, Wis.

Example 2

Ink

In a stainless steel beaker were combined 73.2 grams of a urethane resin from example 5 of U.S. Pat. No. 5,782,966, 73.2 grams of a urethane/urea resin from example 2 of U.S. Pat. No. 5,750,604, and 153.6 grams of S-180 amide wax[1] and about 16.3 g of a cyan copper phthalocyanine tetraester from example 1 of the present application. The materials were blended by stirring in a temperature controlled mantle for about 2 hours at about 115° C. Approximately 5 minutes before filtering, about 3.0 g of Hyflo Super Cell[2] was added with stirring. The molten ink was then filtered through a heated (125° C.) Mott apparatus (available from Mott Mettalurgical) using a 1XWTM#3 (6 micron) Whatman filter at 15 psi nitrogen. The filtered cyan ink was poured into molds and allowed to solidify to form ink sticks. The ink was then placed in a Phaser® 340 printer which uses an offset transfer printing process. The ink was printed using a print head temperature of 140° C., a drum temperature of 60° C., and a paper preheat temperatures of 60° C.

[1] Kemamide S-180-stearyl stearamide available from Witco Chemical Company of Memphis, Tenn.
[2] Hyflo Super Cell available from Fluka Chemie AG.

While the invention has been described above with reference to specific embodiments thereof, it is apparent that many changes, modifications, and variations can be made without departing from the inventive concept disclosed herein. Accordingly, the spirit and broad scope of the appended claims is intended to embrace all such changes, modifications and variations that may occur to one of skill upon a reading of the disclosure. All patent applications, patents and other publications cited herein are incorporated by reference in their entirety.

What is claimed is:

1. A phase change ink composition comprising the combination of at least one phase change ink carrier component and a compatible phase change ink colorant that comprises at least one metal phthalocyanine tetraamide chromogen, at least one metal phthalocyanine tetraester chromogen, or mixtures thereof.

2. The phase change ink composition of claim 1 wherein the phase change ink colorant is at least one metal phthalocyanine tetraester chromogen of a Formula (I):

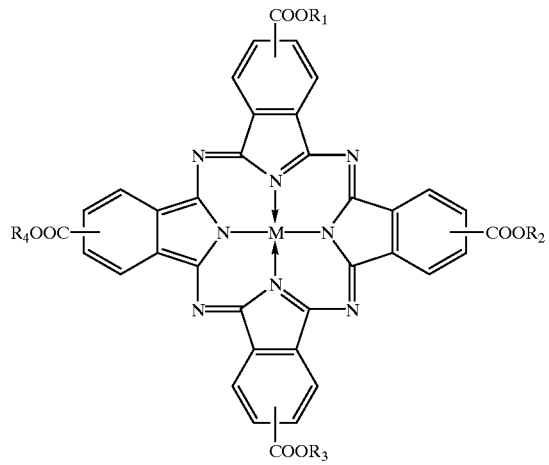

(I)

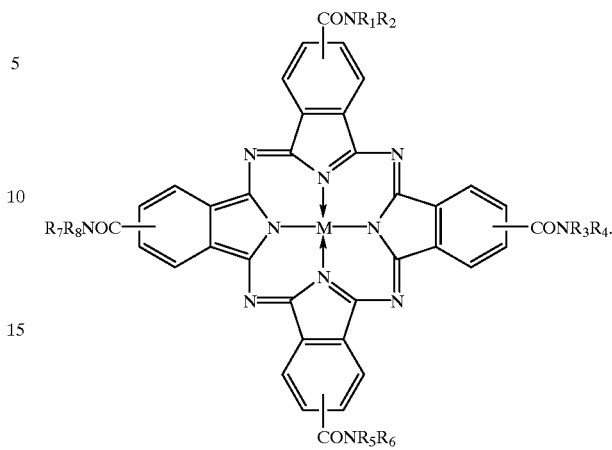

(II)

wherein M is a metal selected from the group consisting of copper, nickel, cobalt, zinc, chromium, aluminum, silicon and iron; and wherein $R_1$, $R_2$, $R_3$ and $R_4$ are individually selected from the group consisting of a linear or a branched alkyl having 1 to about 60 carbon atoms; a cycloalkyl having 1 to about 60 carbon atoms; an aryl; an alkyl/aryl; an alkyleneoxy moiety or an aryleneoxy moiety ranging from about 1 to about 250 repeating units of a homopolymer; an alkyleneoxy moiety or an aryleneoxy moiety ranging from about 1 to about 250 repeating units of a random-copolymer; an alkyleneoxy moiety or an aryleneoxy moiety ranging from about 1 to about 250 repeating units of a block-copolymer form; and mixtures thereof.

3. The phase change ink composition of claim 2 wherein $R_1$, $R_2$, $R_3$ and $R_4$ are individually selected from the group consisting of alkyleneoxy or aryleneoxy derivatives of an aryl or an alkyl/aryl moiety, and wherein the alkyleneoxy or aryleneoxy derivatives range from about 1 to about 250 repeating units of a homopolymer form.

4. The phase change ink composition of claim 2 wherein $R_1$, $R_2$, $R_3$ and $R_4$ are individually selected from the group consisting of alkyleneoxy or aryleneoxy derivatives of an aryl or an alkyl/aryl moiety, and wherein the alkyleneoxy or aryleneoxy derivatives range from about 1 to about 250 repeating units of a random-copolymer form.

5. The phase change ink composition of claim 2 wherein $R_1$, $R_2$, $R_3$ and $R_4$ are individually selected from the group consisting of alkyleneoxy or aryleneoxy derivatives of an aryl or an alkyl/aryl moiety, and wherein the alkyleneoxy or aryleneoxy derivatives range from about 1 to about 250 repeating units of a block-copolymer form.

6. The phase change ink composition of claim 2 wherein M is copper and $R_1$, $R_2$, $R_3$ and $R_4$ are individually selected from the group consisting of a linear alkyl or a branched alkyl having about 21 to about 60 carbon atoms; and an alkyleneoxy derivative of an alkyl/aryl moiety ranging from about 1 to about 5 repeating units of a homopolymer form.

7. The phase change ink composition of claim 1 wherein the phase change ink colorant is at least one metal phthalocyanine tetraamide chromogen of a Formula (II):

wherein M is a metal selected from the group consisting of copper, nickel, cobalt, zinc, chromium, aluminum, silicon and iron and wherein $R_1$, $R_2$, $R_3$, $R_4$, $R_5$, $R_6$, $R_7$ and $R_8$ are individually selected from the group consisting of hydrogen; a linear or a branched alkyl having 1 to about 60 carbon atoms; a cycloalkyl having 1 to about 60 carbon atoms; an aryl; an alkyl/aryl; an alkyleneoxy moiety or an aryleneoxy moiety ranging from about 1 to about 250 repeating units of a homopolymer; an alkyleneoxy moiety or an aryleneoxy moiety ranging from about 1 to about 250 repeating units of a random-copolymer; an alkyleneoxy moiety or an aryleneoxy moiety ranging from about 1 to about 250 repeating units of a block-copolymer form; and mixtures thereof, and where $R_1$ and $R_2$ are not both hydrogen, $R_3$ and $R_4$ are not both hydrogen, $R_5$ and $R_6$ are not both hydrogen, and $R_7$ and $R_8$ are not both hydrogen.

8. The phase change ink composition of claim 7 wherein $R_1$, $R_2$, $R_3$, $R_4$, $R_5$, $R_6$, $R_7$ and $R_8$ are individually selected from the group consisting of alkyleneoxy or aryleneoxy derivatives of an aryl or an alkyl/aryl moiety, and wherein the alkyleneoxy or aryleneoxy derivatives range from about 1 to about 250 repeating units of a homopolymer form.

9. The phase change ink composition of claim 7 wherein $R_1$, $R_2$, $R_3$, $R_4$, $R_5$, $R_6$, $R_7$ and $R_8$ are individually selected from the group consisting of alkyleneoxy or aryleneoxy derivatives of an aryl or an alkyl/aryl moiety, and wherein the alkyleneoxy or aryleneoxy derivatives range from about 1 to about 250 repeating units of a random-copolymer form.

10. The phase change ink composition of claim 7 wherein $R_1$, $R_2$, $R_3$, $R_4$, $R_5$, $R_6$, $R_7$ and $R_8$ are individually selected from the group consisting of alkyleneoxy or aryleneoxy derivatives of an aryl or an alkyl/aryl moiety, and wherein the alkyleneoxy or aryleneoxy derivatives range from about 1 to about 250 repeating units of a block-copolymer form.

11. The phase change ink composition of claim 7 wherein M is copper and $R_1$, $R_2$, $R_3$, $R_4$, $R_5$, $R_6$, $R_7$ and $R_8$ are individually selected from the group consisting of hydrogen; a linear alkyl or a branched alkyl having about 11 to about 60 carbon atoms; an alkyleneoxy derivative of an alkyl/aryl moiety ranging from about 1 to about 30 repeating units of a homopolymer form; and mixtures thereof, and where $R_1$ and $R_2$ are not both hydrogen, $R_3$ and $R_4$ are not both hydrogen, $R_5$ and $R_6$ are not both hydrogen, and $R_7$ and $R_8$ are not both hydrogen.

12. The phase change ink composition of claim 1, wherein the phase change ink composition is used in a direct printing process or an offset printing process.

13. A metal phthalocyanine tetraester dye of a Formula (I):

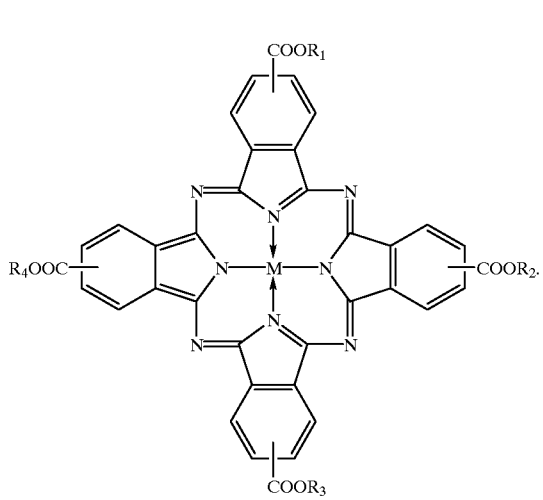

wherein M is a metal selected from the group consisting of copper, nickel, cobalt, zinc, chromium, aluminum and iron; and wherein $R_1$, $R_2$, $R_3$ and $R_4$ are individually selected from the group consisting of a linear or a branched alkyl having 1 to about 60 carbon atoms; a cycloalkyl having 1 to about 60 carbon atoms; an aryl; an alkyl/aryl; an alkyleneoxy moiety or an aryleneoxy moiety ranging from about 1 to about 250 repeating units of a homopolymer; an alkyleneoxy moiety or an aryleneoxy moiety ranging from about 1 to about 250 repeating units of a random-copolymer; an alkyleneoxy moiety or an aryleneoxy moiety ranging from about 1 to about 250 repeating units of a block-copolymer form; and mixtures thereof.

14. The phthalocyanine tetraester dye of claim 13 wherein $R_1$, $R_2$, $R_3$ and $R_4$ are individually selected from the group consisting of alkyleneoxy or aryleneoxy derivatives of an aryl or an alkyl/aryl moiety, and wherein the alkyleneoxy or aryleneoxy derivatives range from about 1 to about 250 repeating units of a homopolymer form.

15. The phthalocyanine tetraester dye of claim 13 wherein $R_1$, $R_2$, $R_3$ and $R_4$ are individually selected from the group consisting of alkyleneoxy or aryleneoxy derivatives of an aryl or an alkyl/aryl moiety, and wherein the alkyleneoxy or aryleneoxy derivatives range from about 1 to about 250 repeating units of a random-copolymer form.

16. The phthalocyanine tetraester dye of claim 13 wherein $R_1$, $R_2$, $R_3$ and $R_4$ are individually selected from the group consisting of alkyleneoxy or aryleneoxy derivatives of an aryl or an alkyl/aryl moiety, and wherein the alkyleneoxy or aryleneoxy derivatives range from about 1 to about 250 repeating units of a block-copolymer form.

17. The phthalocyanine tetraester dye of claim 13 wherein $R_1$, $R_2$, $R_3$ and $R_4$ are individually selected from a group that is compatible with phase change ink.

18. The phthalocyanine tetraester dye of claim 17, wherein the phase change ink is used in a direct printing process or an offset printing process.

19. The phthalocyanine tetraester dye of claim 13 wherein M is copper and $R_1$, $R_2$, $R_3$ and $R_4$ are individually selected from the group consisting of a linear alkyl or a branched alkyl having about 21 to about 60 carbon atoms; and an alkyleneoxy derivative of an alkyl/aryl moiety ranging from about 1 to about 5 repeating units of a homopolymer form; or mixtures thereof.

20. A metal phthalocyanine tetraamide dye of a Formula (II):

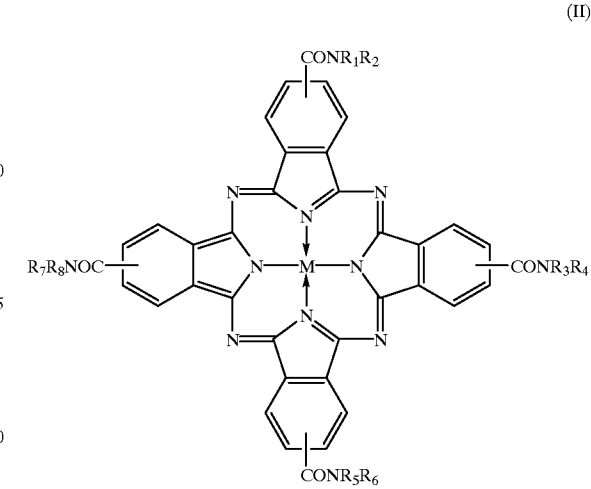

wherein M is a metal selected from the group consisting of copper, nickel, cobalt, zinc, chromium, aluminum and iron and wherein $R_1$, $R_2$, $R_3$, $R_4$, $R_5$, $R_6$, $R_7$ and $R_8$ are individually selected from the group consisting of hydrogen; an alkyleneoxy moiety or an aryleneoxy moiety ranging from about 1 to about 250 repeating units of a homopolymer; an alkyleneoxy moiety or an aryleneoxy moiety ranging from about 1 to about 250 repeating units of a random-copolymer; an alkyleneoxy moiety or an aryleneoxy moiety ranging from about 1 to about 250 repeating units of a block-copolymer form; and mixtures thereof, and where $R_1$ and $R_2$ are not both hydrogen, $R_3$ and $R_4$ are not both hydrogen, $R_5$ and $R_6$ are not both hydrogen, and $R_7$ and $R_8$ are not both hydrogen.

21. The phthalocyanine tetraamide dye of claim 20 wherein $R_1$, $R_2$, $R_3$, $R_4$, $R_5$, $R_6$, $R_7$ and $R_8$ are individually selected from the group consisting of alkyleneoxy or aryleneoxy derivatives of an aryl or an alkyl/aryl moiety, and wherein the alkyleneoxy or aryleneoxy derivatives range from about 1 to about 250 repeating units of a homopolymer form.

22. The phthalocyanine tetraamide dye of claim 20 wherein $R_1$, $R_2$, $R_3$, $R_4$, $R_5$, $R_6$, $R_7$ and $R_8$ are individually selected from the group consisting of alkyleneoxy or aryleneoxy derivatives of an aryl or an alkyl/aryl moiety, and wherein the alkyleneoxy or aryleneoxy derivatives range from about 1 to about 250 repeating units of a random-copolymer form.

23. The phthalocyanine tetraamide dye of claim 20 wherein $R_1$, $R_2$, $R_3$, $R_4$, $R_5$, $R_6$, $R_7$ and $R_8$ are individually selected from the group consisting of alkyleneoxy or aryleneoxy derivatives of an aryl or an alkyl/aryl moiety, and wherein the alkyleneoxy or aryleneoxy derivatives range from about 1 to about 250 repeating units of a block-copolymer form.

24. The phthalocyanine tetraamide dye of claim 20 wherein M is copper and $R_1$, $R_2$, $R_3$, $R_4$, $R_5$, $R_6$, $R_7$ and $R_8$ are individually selected from the group consisting of hydrogen; an alkyleneoxy derivative of an alkyl/aryl moiety ranging from about 1 to about 100 repeating units of a homopolymer form; and mixtures thereof, and where $R_1$ and $R_2$ are not both hydrogen.

25. The phthalocyanine tetraamide dye of claim 20 wherein $R_1$, $R_2$, $R_3$, $R_4$, $R_5$, $R_6$, $R_7$ and $R_8$ are individually selected from a group that is compatible with phase change ink.

26. The phthalocyanine tetraamide dye of claim 25, wherein the phase change ink is used in a direct printing process or an offset printing process.

27. A metal phthalocyanine dye prepared by the reaction of trimellitic anhydride ester, amide or combinations thereof with phthalic anhydride to yield a colorant mixture containing a distribution of mono-, di-, tri- and tetra-substituted chromophore; wherein the trimellitic anhydride ester is selected from the group consisting of a linear or a branched alkyl having 1 to about 60 carbon atoms; a cycloalkyl having 1 to about 60 carbon atoms; an aryl, an alkyl/aryl; an alkyleneoxy moiety or an aryleneoxy moiety ranging from about 1 to about 250 repeating units of a homopolymer; an alkyleneoxy moiety or an aryleneoxy moiety ranging from about 1 to about 250 repeating units of a random-copolymer; an alkyleneoxy moiety or an aryleneoxy moiety ranging from about 1 to about 250 repeating units of a block-copolymer form; and mixtures thereof.

28. The metal phthalocyanine dye of claim 27 wherein the trimellitic anhydride amide is selected from the group consisting of an alkyleneoxy moiety or an aryleneoxy moiety ranging from about 1 to about 250 repeating units of a homopolymer; an alkyleneoxy moiety or an aryleneoxy moiety ranging from about 1 to about 250 repeating units of a random-copolymer; an alkyleneoxy moiety or an aryleneoxy moiety ranging from about 1 to about 250 repeating units of a block-copolymer form; and mixtures thereof.

29. The metal phthalocyanine dye of claim 27 wherein the metal is selected from the group consisting of copper, nickel, cobalt, zinc, chromium, aluminum, silicon and iron.

30. The metal phthalocyanine dye of claim 27 wherein the dye may be used with other dyes and polymeric colorants.

31. The metal phthalocyanine dye of claim 27 wherein the dye is compatible with phase change ink.

32. The metal phthalocyanine dye of claim 31 wherein the phase change ink is used in a direct printing process or an offset printing process.

33. A metal phthalocyanine dye prepared by the reaction of trimellitic anhydride with phthalic anhydride to form mono-, di-, tri-, and tetra-carboxylic acid substituted phthalocyanine; wherein the carboxylic acid substituted phthalocyanine is converted to a mono-, di-, tri-, or tetra-ester, amide and/or amine salt by reaction with an alcohol, an amine or combinations thereof; wherein the alcohol is selected from the group consisting of an alkyleneoxy moiety or an aryleneoxy moiety ranging from about 1 to about 250 repeating units of a homopolymer; an alkyleneoxy moiety or an aryleneoxy moiety ranging from about 1 to about 250 repeating units of a random-copolymer; an alkyleneoxy moiety or an aryleneoxy moiety ranging from about 1 to about 250 repeating units of a block-copolymer form; and mixtures thereof.

34. The metal phthalocyanine dye of claim 33 wherein the amine is selected from the group consisting of an alkyleneoxy moiety or an aryleneoxy moiety ranging from about 1 to about 250 repeating units of a homopolymer; an alkyleneoxy moiety or an aryleneoxy moiety ranging from about 1 to about 250 repeating units of a random-copolymer; an alkyleneoxy moiety or an aryleneoxy moiety ranging from about 1 to about 250 repeating units of a block-copolymer form; and mixtures thereof.

35. The metal phthalocyanine dye of claim 33 wherein the dye is compatible with phase change ink.

36. The metal phthalocyanine dye of claim 35 wherein the phase change ink is used in a direct printing process or an offset printing process.

\* \* \* \* \*